(12) United States Patent
Urbaniak et al.

(10) Patent No.: US 10,032,545 B2
(45) Date of Patent: Jul. 24, 2018

(54) WIRE CABLE SEAL AND VIBRATION DAMPER

(71) Applicant: Delphi Technologies, Inc., Troy, MI (US)

(72) Inventors: Andreas Urbaniak, Muenster (DE); Hans Guenter Osthoff, Sprockhoevel (DE); Andreas Hahn, Solingen (DE); Ruediger Dietsch, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/386,438

(22) Filed: Dec. 21, 2016

(65) Prior Publication Data

US 2017/0200537 A1 Jul. 13, 2017

(30) Foreign Application Priority Data

Jan. 7, 2016 (EP) .................................... 16150439

(51) Int. Cl.
| | |
|---|---|
| *H02G 3/18* | (2006.01) |
| *H01B 17/30* | (2006.01) |
| *H02G 15/06* | (2006.01) |
| *H01R 13/52* | (2006.01) |
| *H01R 13/533* | (2006.01) |

(52) U.S. Cl.
CPC ......... *H01B 17/30* (2013.01); *H01R 13/5216* (2013.01); *H01R 13/533* (2013.01); *H02G 15/06* (2013.01)

(58) Field of Classification Search
CPC ............ B60R 16/0207; B60R 16/0222; H01B 7/0045; H01B 3/28; H01B 5/16; H01B 3/32; H01B 3/20; H01B 3/30; H01B 3/34; H01B 3/46; H01B 3/465; H01B 17/00; H01B 17/26; H01B 17/30; H01B 17/583; H01R 4/00; H02G 15/08; H02G 15/04; H02G 15/18; H02G 3/083; H02G 3/22; H02G 3/088; H02G 3/18; H02G 3/24; H05K 2201/2036; H05K 3/301; H05K 3/303; H05K 7/14; H05K 7/142; H05K 9/0018

See application file for complete search history.

(56) References Cited

U.S. PATENT DOCUMENTS

| | | | | |
|---|---|---|---|---|
| 4,629,269 | A | * 12/1986 | Kailus ................ | H01R 13/5221 |
| | | | | 439/587 |
| 5,542,856 | A | 8/1996 | Wood | |
| 5,588,856 | A | * 12/1996 | Collins .............. | H01R 13/5208 |
| | | | | 439/204 |

(Continued)

FOREIGN PATENT DOCUMENTS

| | | |
|---|---|---|
| CN | 1619891 A | 5/2005 |
| CN | 102326301 A | 1/2012 |

(Continued)

*Primary Examiner* — Pete Lee
(74) *Attorney, Agent, or Firm* — Robert J. Myers

(57) ABSTRACT

A sealing element for sealing a housing opening in a housing, wherein the sealing element comprises at least one through-opening for the passage of an electrical cable into the housing. The sealing element is formed of a first subcomponent and a second subcomponent, the first subcomponent and the second subcomponent having a different hardness and the two subcomponents are made of silicone.

14 Claims, 7 Drawing Sheets

(56) References Cited

U.S. PATENT DOCUMENTS

| | | | | |
|---|---|---|---|---|
| 8,100,716 | B2* | 1/2012 | Yahya | H01R 13/5208 |
| | | | | 439/587 |
| 9,257,781 | B2* | 2/2016 | Pade | H01R 13/5208 |
| 9,528,636 | B2* | 12/2016 | Beele | F16L 5/10 |
| 2008/0119079 | A1* | 5/2008 | Suzuki | H01R 13/5208 |
| | | | | 439/281 |
| 2009/0017659 | A1* | 1/2009 | Yoneda | H01R 13/5208 |
| | | | | 439/271 |
| 2010/0210794 | A1* | 8/2010 | Frese | C08L 83/04 |
| | | | | 525/478 |
| 2010/0291782 | A1* | 11/2010 | Wade | H01R 13/5208 |
| | | | | 439/271 |
| 2011/0300731 | A1* | 12/2011 | Nakamura | H01R 13/504 |
| | | | | 439/271 |
| 2012/0100739 | A1* | 4/2012 | Ton | H01R 13/5208 |
| | | | | 439/278 |
| 2013/0106060 | A1* | 5/2013 | Beele | F16L 5/10 |
| | | | | 277/314 |
| 2014/0377974 | A1 | 12/2014 | Pade | |

FOREIGN PATENT DOCUMENTS

| | | | |
|---|---|---|---|
| CN | 102683966 | A | 9/2012 |
| CN | 102742090 | A | 10/2012 |
| CN | 102957037 | A | 3/2013 |
| CN | 103003610 | A | 3/2013 |
| CN | 104823335 | A | 8/2015 |
| DE | 102005057266 | A1 | 6/2007 |
| EP | 2463964 | A1 | 6/2012 |
| EP | 2463964 | B1 | 4/2015 |
| WO | 2009074850 | A1 | 6/2009 |
| WO | 2014060791 | A1 | 4/2014 |

* cited by examiner

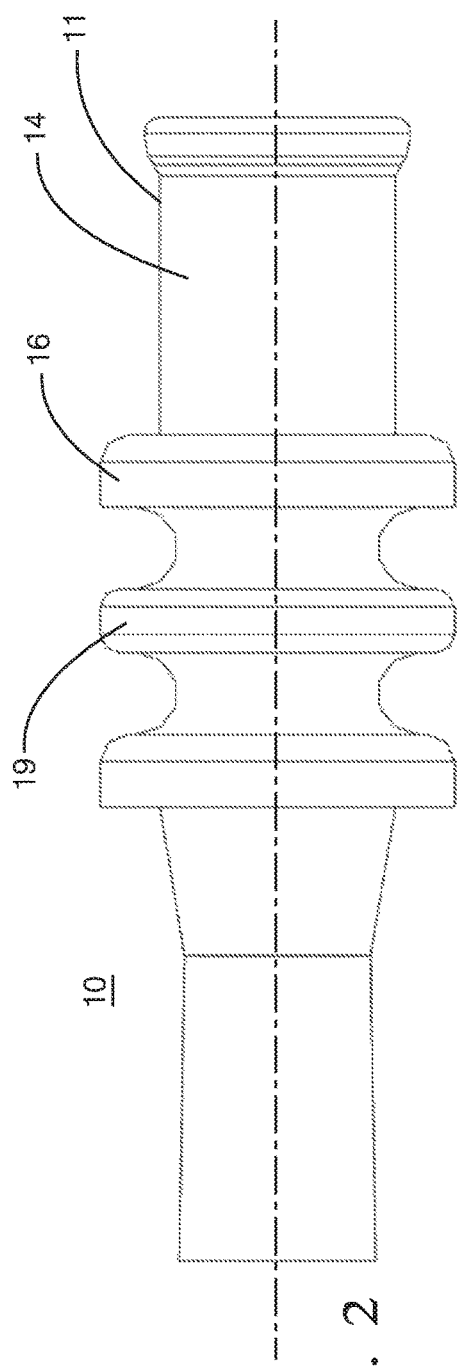
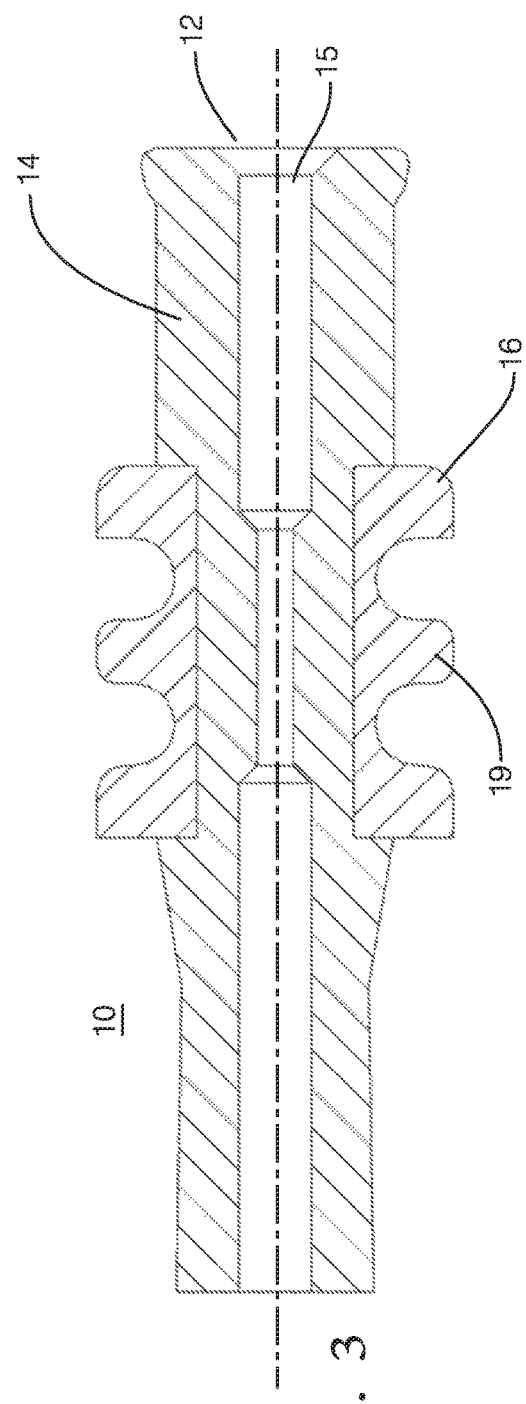
FIG. 2
FIG. 3

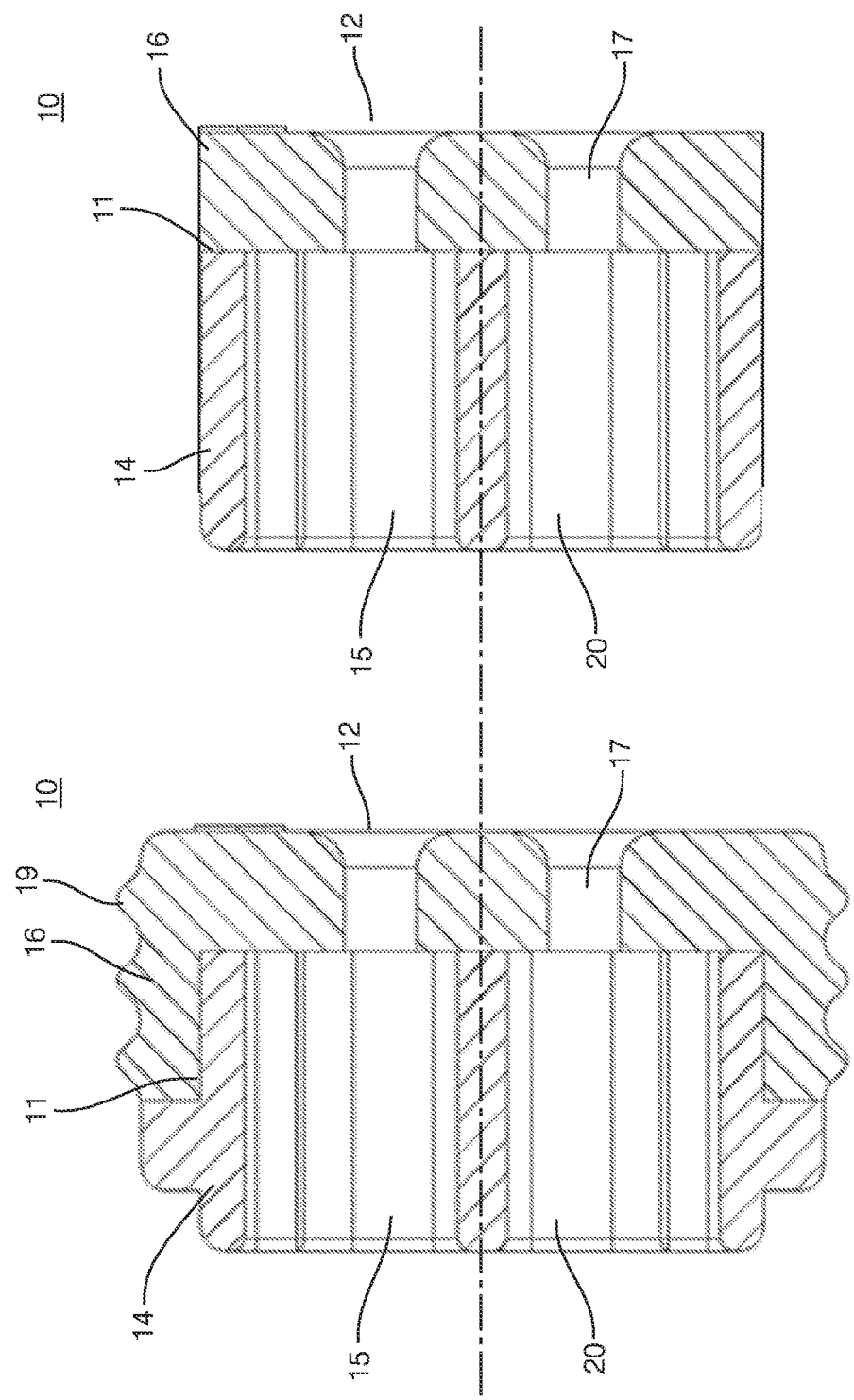

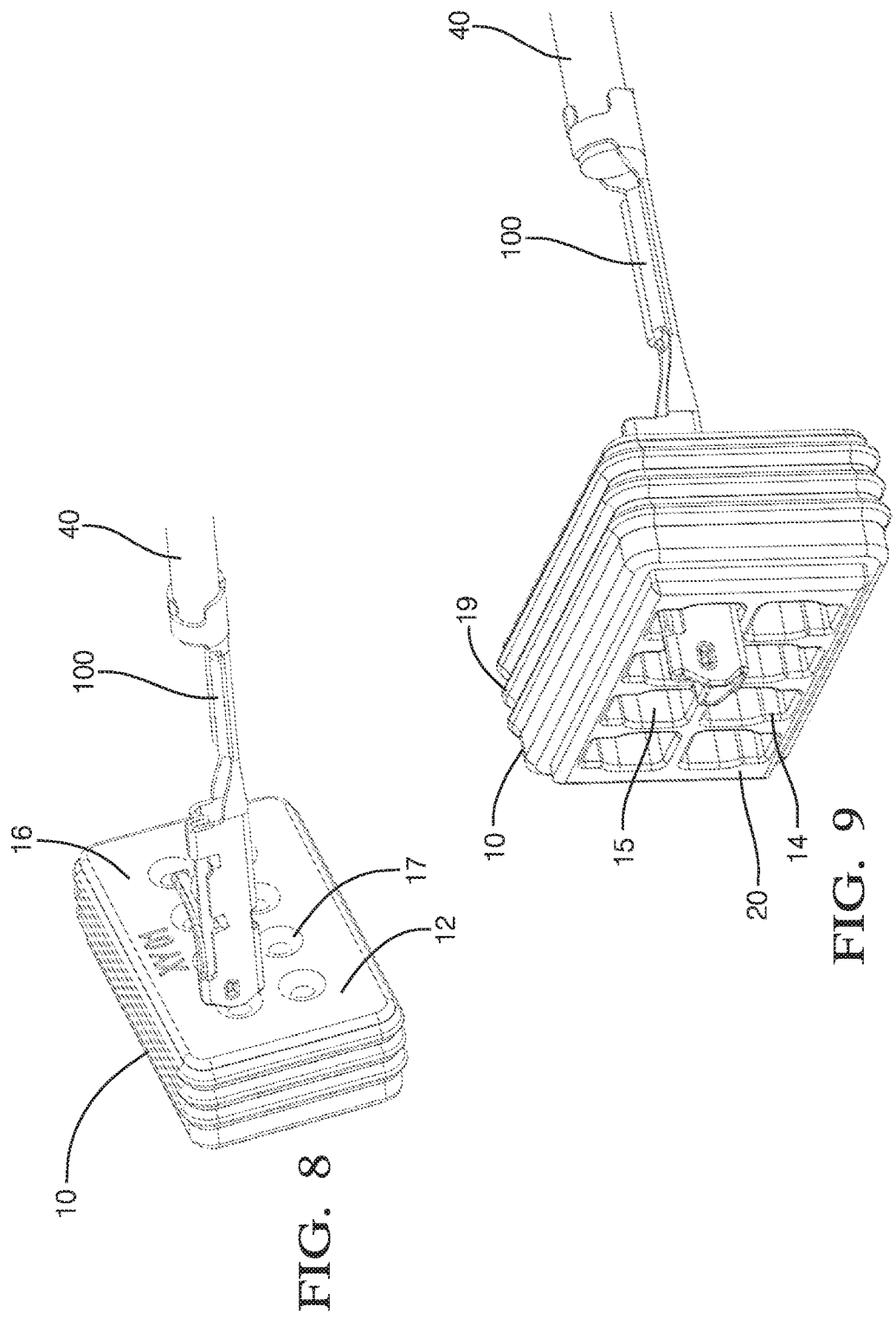

WIRE CABLE SEAL AND VIBRATION DAMPER

CROSS-REFERENCE TO RELATED APPLICATION

This application claims the benefit under 35 U.S.C. § 119(a) of European Patent Application No. 16150439.4 filed in the European Patent Office on Jan. 7, 2016, the entire disclosure of which is hereby incorporated by reference.

TECHNICAL FIELD OF THE INVENTION

The invention relates to the field of wire cable seals, and in particular wire cable seals that also provide vibration dampening.

BACKGROUND OF THE INVENTION

In automotive production, the trend to use electronic modules to deal with the various tasks of safety as well as environmental protection is unabated. Since, despite the use of bus systems, the number of electrical cables and plug connections is steadily increasing, one attempts to control the situation with miniaturization and to keep the number of cable set variants within limits. However, since the handling of miniaturized plug-in systems is problematic and even a moderate failure rate is not tolerable, the development must continue. A factor for reducing failure rates is the prevention of corrosion on electrical contacts. This includes the sealing of plug housings. Plug housings are already sealed very elaborate to protect against external environmental influences such as moisture. A method known in the art is to provide individual electrical cables with a single seal. Another possibility is to use a mat seal for sealing a plurality of cables simultaneously. These methods are well established, but show weaknesses when the plug-in systems become very small. With the plug-in systems becoming smaller, also the tolerances that are to be maintained are smaller.

Further problems arise when the plug-in systems are to be automatically fitted with contact parts. In the case of mat-sealed plug-in systems, the contact elements need to be pushed through the through-openings during assembly. Here, faulty plug-ins have fatal consequences and generate high rework costs. The mat seals used in some plug-in systems tend to deform. This happens when the plug is fitted and the cable diameters expand the sealing openings. Here, a hole offset can occur which makes the subsequent assembly problematic. The contact element is deflected during insertion through the now displaced opening of the sealing and cannot be inserted into the rear contact chamber. Furthermore, the mat seal may be damaged. A further problem for the mat seals and other sealing elements are the sharp edges of the contact elements and the plug housings. These can generally not be avoided during manufacture. They may cut into the sealing material and damage the seal. Last but not least, the problem of vibration plays a growing role in vehicle technology. New engine generations cause vibrations in all conceivable frequency ranges. Under certain conditions, these vibrations can drastically reduce the lifetime of vehicle components.

FIG. 1 shows a sealed plug according to the prior art in sectional view. The sealing element 10 is not yet inserted into the housing opening 31 of the plug housing 30. The sealing element 10 is formed in one piece. It has a profile 19 at the outer circumference and in the through-openings 12.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

A connector including a housing, a lever for facilitating the connection, a slide for facilitating the connection and a cable guide cover are presented. The lever is rotatably mounted on the cable guide cover about an axis of rotation. The rotation of the lever thus takes place essentially between a pre-coupling position, in which a counter-connector may be coupled to the connector, and a locking position, in which the connector and the counter-connector are locked together. The slide is movably mounted on the housing. It is driven via the lever in translation in a direction that is essentially perpendicular to the axis of rotation of the lever. The translation takes place essentially between an initial position, corresponding to the pre-coupling position of the lever, and a final position, corresponding to the locking position of the lever. In the course of its translation, the slide cooperates with the counter-connector in order to couple the counter-connector to the connector.

The invention relates to a sealing element for sealing electrical cables which extend from outside through a housing opening into a housing. The sealing element thereby seals both the electrical cables passing through and the housing opening against external environmental influences. The invention also provides for reduction of vibration of the electrical cables in a housing, as well as for haptic stabilization of an electrical cable when manually plugged into a housing.

The object of the invention is to provide a sealing element which reliably seals electrical cables which are passed into a housing and additionally acts as damping element. The sealing element should, in particular, withstand the increased demands on vibration resistance and temperature resistance.

In particular, by means of a sealing element for sealing a housing opening in a housing, wherein the sealing element comprises a through-opening for the passage of an electrical cable into the housing. The sealing element is formed of a first subcomponent and a second subcomponent, the first subcomponent and the second subcomponent having a different hardness and the two subcomponents are made of silicone.

The sealing element according to the invention has two subcomponents, both made of resilient flexible silicone material. As used herein silicone or silicone material refers to liquid silicone rubber (LSR) which is widely used in the industry. With various material mixtures, the subcomponents can have different hardness. The terms "hardness" and "Shore hardness" as used herein refer to the material characteristic for elastomers and plastics, developed by Albert Shore in 1915 and defined in the standards DIN EN ISO 868 and DIN ISO 7619-1. Since a certain flexibility is still present even with a relatively high Shore hardness of the silicone, a subcomponent creating a stability can be manufactured therefrom, which is still flexible enough to sealingly surround an electrical cable and to dampen vibrations. At the same time, said subcomponent is sufficiently stiff to provide the sealing element with an inherently stable body which allows good handling during assembly. For the second subcomponent, with a lower Shore hardness, the focus is on the sealing characteristics. The second subcomponent is applied to the harder first subcomponent and can seal there.

The sealing element can be produced by two different methods. In the over molding process, the first subcomponent is manufactured on a standard injection molding machine and then transferred to a second injection molding machine where it is inserted again and the second material is injected over it.

In the two component injection molding process, the above-described process takes place in only one specific injection molding machine and is performed without interruption. The machine has two injection units and thus can process two different materials successively in a single pass. The position of the first subcomponent can be changed in the tool as required. The tools used are adapted to the process sequence.

According to an embodiment, the first subcomponent and the second subcomponent are connected non-detachably. After the second subcomponent has been applied to the first subcomponent, the two silicone materials crosslink at the connecting surfaces. The two components of the sealing element are then non-detachably connected together, whereby the subcomponents cannot be shifted or become lost.

According to a further embodiment, the sealing element is elastically deformable. The sealing element always retains a certain flexibility, whereby it is insensitive to bending during assembly. Furthermore, the walls and edges of the first subcomponent can yield somewhat to temporarily create space for shifted parts of the second subcomponent during assembly of the electrical cable. This prevents shearing of the resilient second subcomponent at sharp edges of the housing.

The through-opening may be provided in the first subcomponent and/or in the second subcomponent. The through-geometry in the sealing element is predetermined by the requirements for the sealing element. The material characteristics need to be considered when dimensioning the through-geometry.

According to a further embodiment, the second subcomponent has a profile. The profile is located where the sealing element is adjacent to surfaces of the housing. There, the profile seals by clinging against the contact surface of the housing. The profile can be designed in the form of waves, sealing lips or other known shapes to improve the sealing effect.

According to a further embodiment, the first subcomponent has a greater hardness than the second subcomponent. The first subcomponent has the function of a supporting framework for the second subcomponent. The first subcomponent largely gives the sealing element its dimensions.

The hardness of the first subcomponent may be in the range between 60 and 90 Shore and the hardness of the second subcomponent may be in the range between 20 and 50 Shore. Combinations of silicone with hardness of, for example, 70 Shore with 20 Shore but also 50 Shore with 15 Shore are a good tradeoff of form stability and sealing effect. However, other combinations can also be selected for specific applications.

According to a further embodiment, the hardness of the silicone varies along the through-opening. This structure offers the advantage of providing a sealing element which can be securely fixed in a housing opening by means of a first harder subcomponent and guides the passed-through electrical cable flexibly, but protected from bending, from the housing.

The first subcomponent may have a substantially cylindrical shape, and the second subcomponent may at least partially cover the surface of the first subcomponent. This embodiment is particularly suitable for a single-conductor seal. The electrical cable with attached sealing element is pushed through the housing opening into the housing. The electrical cable is sealingly surrounded by the first subcomponent at a predetermined position. The second subcomponent seals the remaining space between the first subcomponent and the housing opening when the sealing member is located in the housing opening. The through-opening in the first subcomponent along the course of the through-opening can be designed such that the pressure on the region in which the second subcomponent seals against the housing opening is increased. If the opening in the first subcomponent is narrowed in this region, then the electrical cable moved into the through-opening pushes the material of the second subcomponent additionally against the inner surface of the housing opening. This is only possible since both subcomponents are resiliently formed. In addition, the length of the first subcomponent may be dimensioned such that a portion of the first subcomponent protrudes from the housing opening when the sealing means is mounted. This embodiment serves for better handling during assembly. The first subcomponent is dimensioned at such length that the operator can grab it and can better handle the thus enforced cable. This is advantageous when manually plugging thin cables into housings.

The first subcomponent may be constructed in the form of a mesh, and the second subcomponent may at least partially cover the surface of the first subcomponent. Very flat sealing geometries may be achieved by this embodiment. The mesh structure of the first subcomponent acts as framework for the second subcomponent. Thus, less or no holding devices are required for holding the sealing element in the housing. As required, longitudinal sealing elements may also be produced, in relation to the longitudinal axis of the cable. The geometry of the first subcomponent significantly determines the shape of the sealing element.

According to a further embodiment, the through-opening in the first subcomponent has a larger cross-section than in the second subcomponent. In order not to damage the contact element or the first subcomponent when moving the contact element through the sealing element, the cross-section in the first subcomponent is larger. Due to its higher flexibility, the second subcomponent is capable of allowing the contact element to move through a smaller cross-section, wherein this region being able to expand considerably.

The sealing element may be constructed in layers, wherein the first layer is formed by the first subcomponent and the second layer is formed by the second subcomponent. This construction allows the manufacturing of mat seals with a plurality of through-openings. These mats may be cut later as required. This type of sealing element can be produced particularly easy, since only flat surfaces need to be coated. This allows the use of a simpler injection molding tool.

According to a further embodiment, the cross-section of the through-opening varies along the region in which the sealing element surrounds the electrical cable. Thus, it is possible to realize regions with different characteristics. In general, the following rules apply for flexible sealing elements. A smaller cross-section can very well seal the cable passing through. A larger cross-section reduces the required insertion force when inserting the contact element. The larger cross-section guides the contact element in the sealing means.

According to a further embodiment, the layer thickness of the second subcomponent is less than the layer thickness of the first subcomponent. Thereby, the elasticity of the second subcomponent remains guaranteed in the region of the through-opening. Thus, very elastic through-openings can be created with small layer thicknesses.

An electrical connection cable includes an electrical cable with a contact element attached to one end of the electrical cable. A housing having a housing opening. A sealing element which sealingly surrounds the electrical cable in the housing opening.

BRIEF DESCRIPTION OF THE SEVERAL VIEWS OF THE DRAWING

The present invention will now be described, by way of example with reference to the accompanying drawings, in which:

FIG. 2 shows a sealing element according to a first embodiment;

FIG. 3 shows a sectional view of the sealing element according to the first embodiment;

FIG. 6 shows a sectional view of the sealing element according to the second embodiment;

FIG. 7 shows a sectional view of a sealing element according to a third embodiment;

FIG. 8 shows a perspective view of the sealing element with a pre-positioned contact element;

FIG. 9 shows a perspective view of the sealing element, wherein a contact element passes through the sealing element;

DETAILED DESCRIPTION OF THE INVENTION

Figure 1:
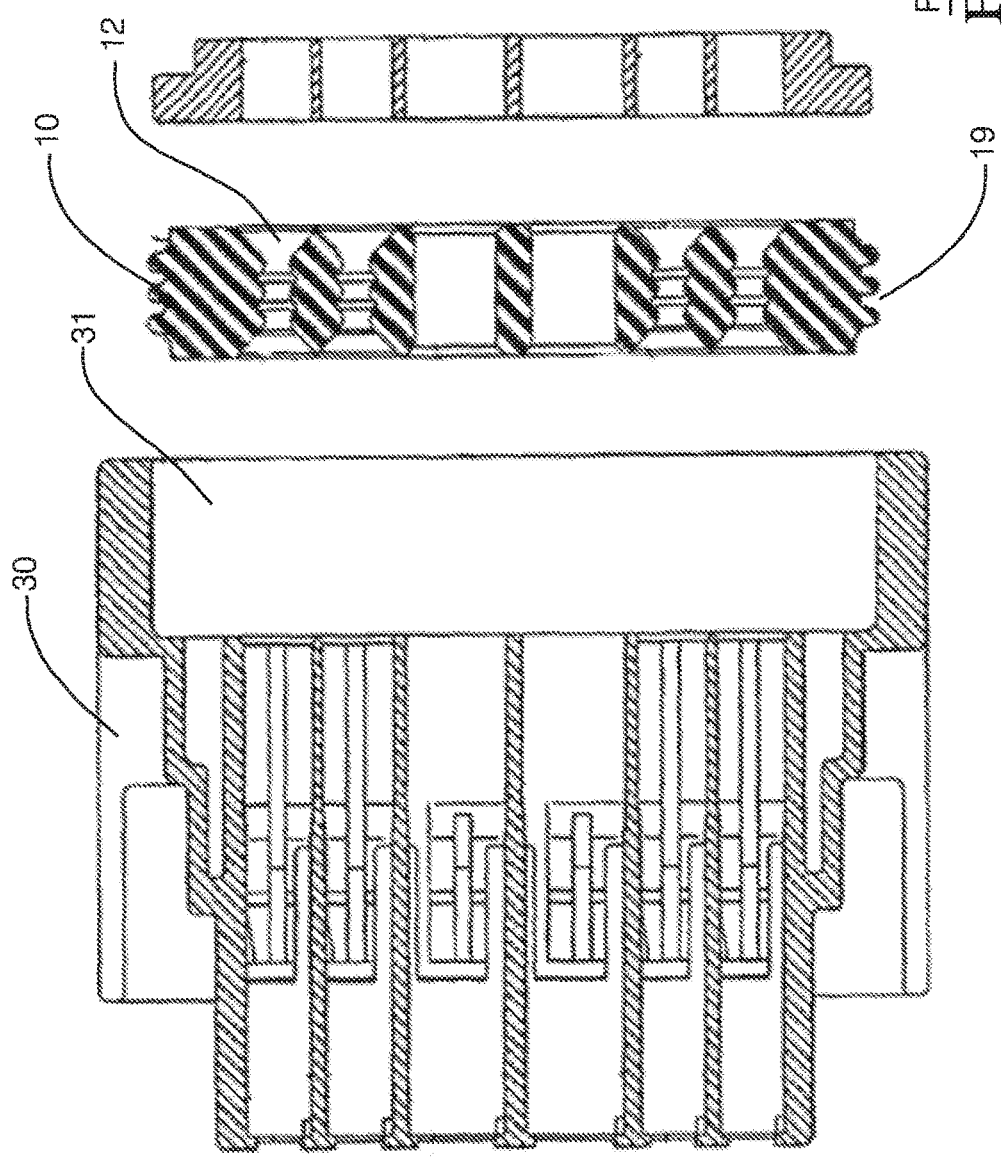
FIG. 1 shows a sealed plug according to the prior art.

FIG. 2 shows a non-limiting example of a sealing element 10 according to a first embodiment. The sealing element 10 has a first cylindrical subcomponent 14. A second subcomponent 16 is mounted coaxially around the first subcomponent 14 on the surface 11 of the first subcomponent 14. The second subcomponent 16 surrounds only a part along the first cylindrical subcomponent 14. The surface of the second subcomponent 16 has a profile 19.

FIG. 3 shows a sectional view of the first embodiment of the sealing element 10 of FIG. 2. The first subcomponent 14 of the sealing element 10 has a through-opening 12 which extends along the cylindrical body from one end to the other end. The through-opening 12 has a narrowing in the middle region. The second subcomponent 16 surrounds a middle region of the first subcomponent 14 in a sleeve-like manner.

Figure 4:
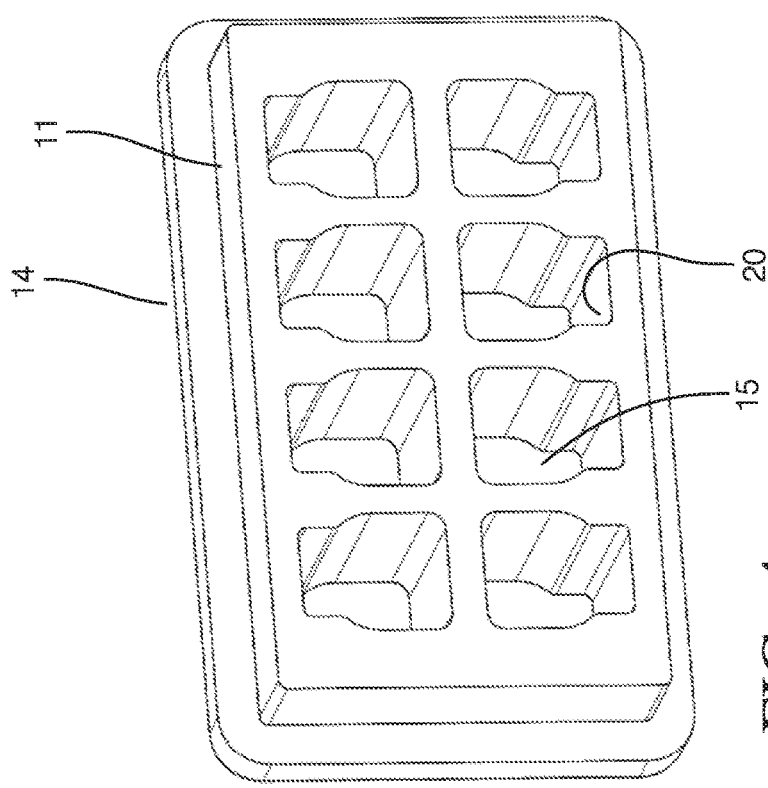
FIG. 4 shows the first subcomponent of the sealing element according to a second embodiment.

FIG. 4 shows the first subcomponent 14 of a second embodiment of the sealing element 10 in perspective view. In this embodiment, the sealing element 10 is able to seal a plurality of individual electrical cables 40. The first subcomponent 14 has an essentially cuboid shape and first openings 15, through which the electrical cables 40 can later be inserted. In this embodiment, a plurality of first openings 15 is provided in the first subcomponent 14 in a serial arrangement. Since the subcomponent 14 has a specific material thickness, the first openings 15 form tubes 20 through the first subcomponent 14.

Figure 5:
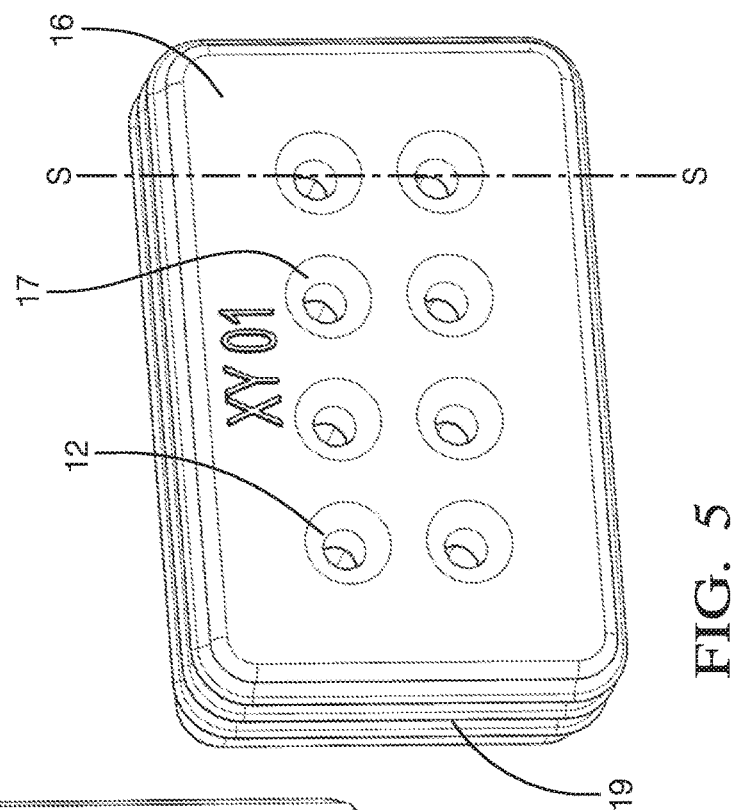
FIG. 5 shows a sealing element according to the second embodiment.

FIG. 5 shows a second embodiment of the sealing element 10 in perspective view. In this depiction, the second subcomponent 16 was applied to the first subcomponent 14 (FIG. 4). Here, the second subcomponent 16 covers all surfaces 11 of the first subcomponent 14 which are visible in FIG. 4, so that only the second subcomponent 16 is visible. Second openings 17 are provided in the second subcomponent 16, which are aligned with the first openings 15 of the first subcomponent 14. The second openings 17 in the second subcomponent 16 are significantly smaller than the first openings 15 in the first subcomponent 14. Together they form the through-opening 12 through the sealing element 10. A profile 19 extends around the narrow edge of the cuboid, which seals the sealing element 10 to the housing opening 31.

FIG. 6 shows a sectional view of the sealing element 10 according to the second embodiment (FIG. 4, FIG. 5) along the cutting edge S. The first subcomponent 14 is partially covered by the second subcomponent 16. The second subcomponent 16 has second openings 17, which are aligned with the first openings 15 of the first subcomponent 14 and thereby allow the passage of electrical cables 40 therethrough.

FIG. 7 shows a sectional view of the sealing element 10 according to a third embodiment. In this embodiment, the second subcomponent 16 is applied only on one side of the cuboid first subcomponent 14.

FIG. 8 shows a perspective view of the sealing element 10 and a contact element 41 positioned in front of the through-opening 12 in the sealing element 10. In this depiction, it can be seen that the contact element 41 has a significantly larger diameter than the second opening 17 in the second subcomponent 16.

FIG. 9 shows a perspective view of the sealing element 10, wherein a contact element 41 passes through the sealing element 10. This depiction shows the side of the sealing element 10 at which the first subcomponent 14 is not covered by the second subcomponent 16. The first openings 15 in the first subcomponent 14 are significantly larger than the second openings 17 in the second subcomponent 16, as a result of which material of the second subcomponent 16 can be temporarily displaced into the first opening 15 of the first subcomponent 14. The tube shape 20 of the first openings 15 guides the contact element 41 through the sealing element 10 when being inserted.

Figure 10:
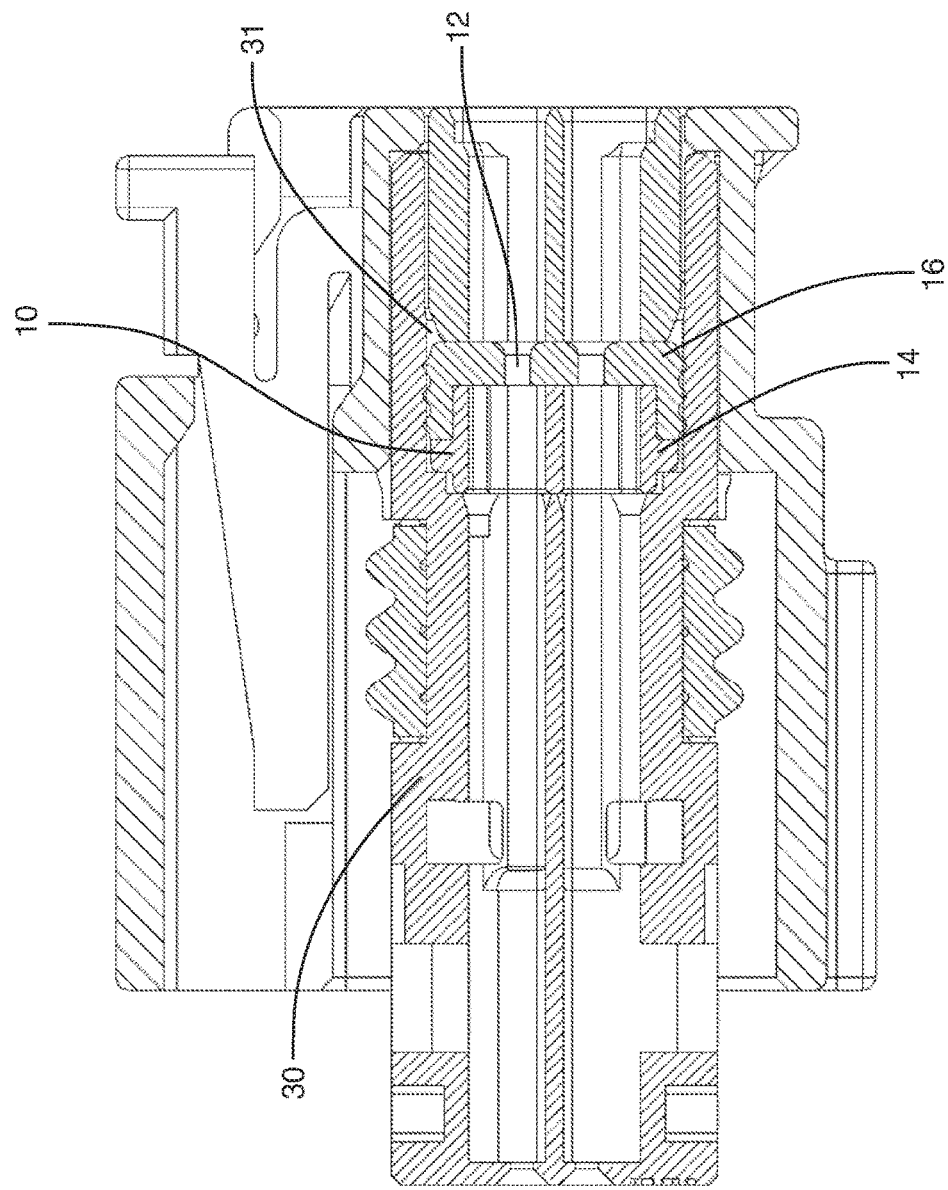
FIG. 10 shows a sectional view of a housing with and inserted sealing element.

FIG. 10 shows a housing 30 with inserted sealing element 10 in sectional view. The sealing element 10 is positioned in the housing opening 31. The profile 19 of the second subcomponent 16 seals against the housing opening 31. The through-opening 12 in the sealing element 10 is ready to let the cable 40 with attached contact elements 41 to be passed and thereafter to seal the cable 40.

Figure 11:
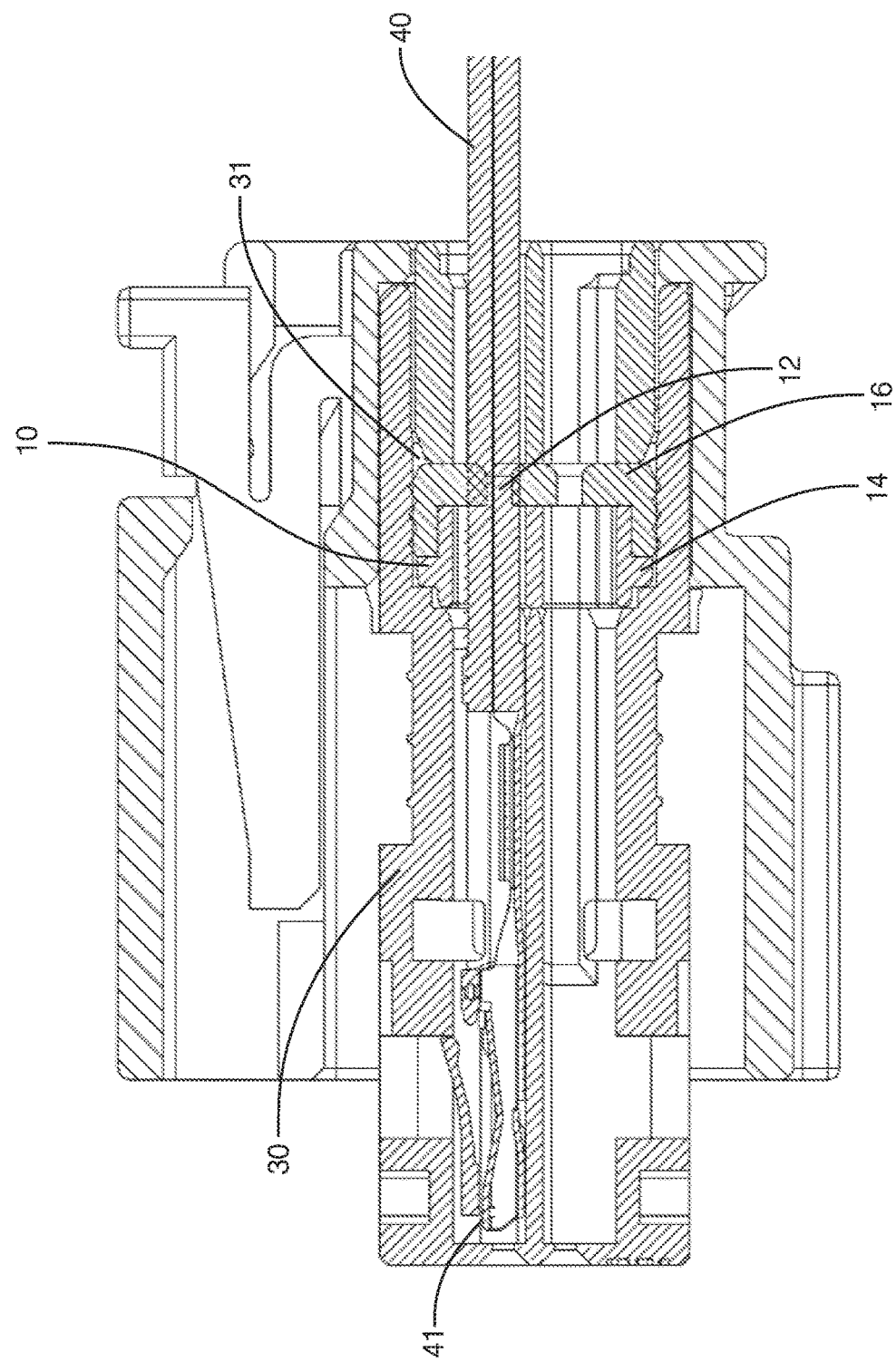
FIG. 11 shows a sectional view of a housing with an inserted sealing element and an inserted electrical cable.

FIG. 11 shows a housing 30 with inserted sealing element 10 and inserted electrical cable 40 in sectional view. The contact element 41 is latched in the housing 30 and the electrical cable 40 attached thereto is guided through the through-opening 12 in the sealing element 10 to the outside.

While this invention has been described in terms of the preferred embodiments thereof, it is not intended to be so limited, but rather only to the extent set forth in the claims that follow. Moreover, the use of the terms first, second, primary secondary, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A sealing element for sealing a housing opening in a housing, wherein the sealing element comprises:
   a first subcomponent formed of a first silicone material having a first-hardness; and
   a second subcomponent formed of a second silicone material having a second-hardness, the first-hardness being greater than the second-hardness, wherein the first silicone material is cross-linked with the second silicone material at the interface between the first subcomponent and the second subcomponent, thereby bonding the first subcomponent and the second subcomponent to one another, and wherein the sealing element defines a through-opening for passage of an electrical cable into the housing.

2. The sealing element according to claim 1, wherein the sealing element is elastically deformable.

3. The sealing element according to claim 1, wherein the through-opening is provided in the first subcomponent.

4. The sealing element according to claim 1, wherein an outer surface of the second subcomponent defines an undulate profile.

5. The sealing element according to claim 1, wherein the hardness of the first subcomponent is in a range between 60 and 90 Shore and the hardness of the second subcomponent is in a range between 20 and 50 Shore.

6. The sealing element according to claim 1, wherein the hardness of the silicone varies along the through-opening.

7. The sealing element according to claim 1, wherein the first subcomponent has a cylindrical shape, and the second subcomponent at least partially covers a surface of the first subcomponent.

8. The sealing element according to claim 1, wherein the first subcomponent is constructed of a mesh material and the second subcomponent at least partially covers a surface of the first subcomponent.

9. The sealing element according to claim 1, wherein the first subcomponent defines another through-opening that has a larger cross-section than the through-opening of the second subcomponent.

10. The sealing element according to claim 1, wherein the sealing element is constructed in layers, wherein a first layer is formed by the first subcomponent and a second layer is formed by the second subcomponent.

11. The sealing element according to claim 1, wherein a cross-section of the through-opening varies along a region in which the sealing element surrounds the electrical cable.

12. The sealing element according to claim 1, wherein a first layer thickness of the first subcomponent is greater than a second layer thickness of the second subcomponent.

13. An electrical cable assembly, comprising:
   an electrical cable with a contact element attached to one end of the electrical cable;
   a housing having a housing opening; and
   a sealing element according to claim 1 which sealingly surrounds the electrical cable in the housing opening.

14. The sealing element according to claim 1, wherein the through-opening is provided in the second subcomponent.

* * * * *